July 9, 1940.                R. C. BUELL                2,207,577
                      ELECTRIC PROTECTIVE SYSTEM
                         Filed Oct. 16, 1937
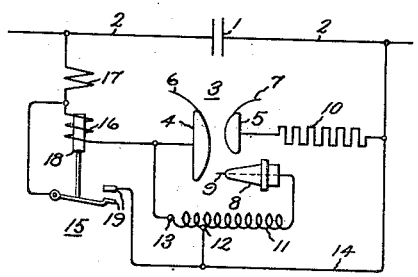
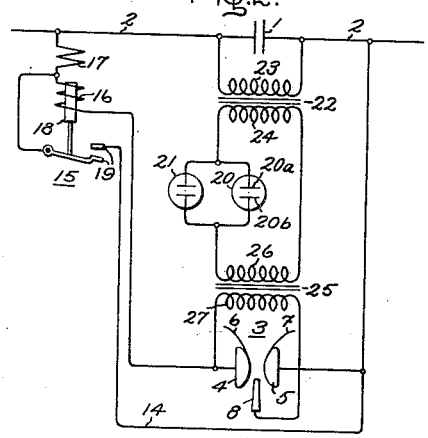
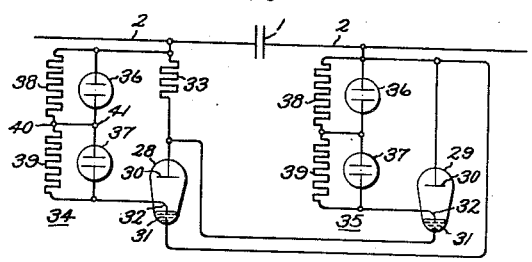
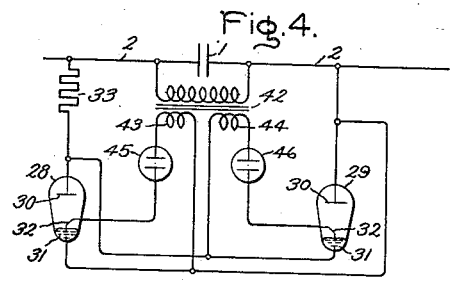
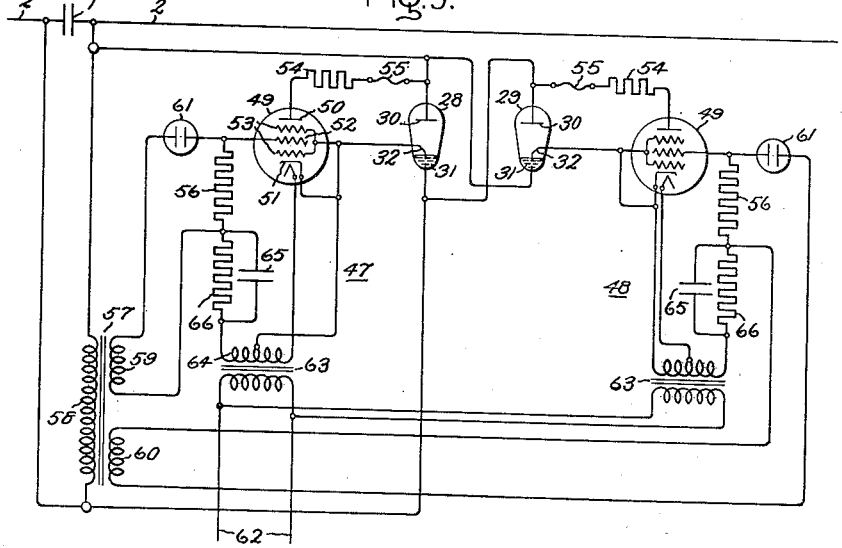
Inventor:
Roy C. Buell,
by Harry E. Dunham
His Attorney.

Patented July 9, 1940

2,207,577

UNITED STATES PATENT OFFICE 2,207,577

ELECTRIC PROTECTIVE SYSTEM

Roy C. Buell, Niskayuna, N. Y., assignor to General Electric Company, a corporation of New York Application October 16, 1937, Serial No. 169,428

11 Claims. (Cl. 175—294)

My invention relates to electric protective systems and more particularly to electric valve circuits for protecting electrical apparatus subjected to variable voltage conditions.

In the protection of electrical apparatus which is subjected to variable voltage operating conditions, it is frequently desirable to provide protective circuits which are rugged in construction and arrangement and which also are susceptible of responding in a precise manner to protect the apparatus when the operating voltage exceeds a predetermined value. For example, in electric power transmission and distribution systems employing series capacitances it has been found that it is highly desirable to provide protective arrangements to limit the voltage appearing across the terminals of the capacitances when the voltage thereacross tends to exceed a certain value. As is generally known, the primary purpose of a series capacitance is the neutralization of the voltage drop due to the inductive reactance of a transmission line or distribution circuit, and thereby eliminate the voltage variations due to the inductive reactance of the line. Because the series capacitance is subjected to variable voltage conditions, it is important that the capacitance be protected when the voltage thereacross begins to rise to a value which may be injurious to the capacitance. One of the ways in which the series capacitance has been protected is by the use of a parallel circuit which may be connected across the series capacitance to short circuit the capacitance when the voltage exceeds the critical value. Heretofore arc gaps have been connected across the capacitance to short circuit the capacitance when the voltage became excessive. These arrangements are subject to the difficulty encountered in designing an arc gap to respond precisely and accurately. As is well known, the geometrical configuration of the arc gap surfaces and the condition of the surfaces affect substantially the voltage at which the arc gap breaks down and after the gap has functioned several times, in many arrangements, it frequently loses the precision of operation which is necessary in the protection of series capacitances.

It is an object of my invention to provide a new and improved electric protective system.

It is another object of my invention to provide a new and improved over-voltage protective system for electrical apparatus which is subjected to variable voltage operating conditions.

It is a further object of my invention to provide a new and improved electric valve circuit for protecting electrical apparatus.

It is a still further object of my invention to provide a new and improved protective circuit for series capacitances.

In accordance with one of the illustrated embodiments of my invention, I provide a new and improved protective system for series capacitances in which a protective device is connected in parallel with a series capacitance and which is arranged to conduct current when the voltage impressed across the terminals of the capacitance exceeds a predetermined value. The device comprises a pair of principal or main electrodes which are connected to the terminals of the series capacitance. A control member or electrode in the region of the principal electrodes is provided to initiate an arc discharge between the principal electrodes when the voltage of the capacitance exceeds a predetermined value. The control electrode is constructed in a manner to initiate the arc discharge at an accurately determinable value of voltage. An additional protective circuit is arranged to be connected in parallel with the discharge device and the series capacitance in response to the current conducted by the discharge device. The additional protective circuit may be operatively connected in parallel with the capacitance and the discharge device by means of a contactor or relay which is operated in response to the current transmitted between the principal electrodes or in accordance with the current transmitted between one of the principal electrodes and the control electrode.

In accordance with another embodiment of my invention, I provide an improved protective system for electrical apparatus subjected to variable voltage conditions and which comprises a voltage responsive element such as an electric valve of the glow discharge type having a plurality of cold electrodes which effect energization of the discharge initiating means when the voltage of the apparatus exceeds a predetermined value.

In accordance with a further embodiment of my invention, I provide a new and improved protective system for variable voltage electrical apparatus which comprises an electric valve which is connected across the terminals of the apparatus and which is arranged to be rendered conductive when the voltage impressed on the apparatus exceeds a predetermined value. A pair of oppositely disposed electric valves may be connected across the apparatus to permit the conduction of current in both directions. The electric valves may be of the type employing an ionizable medium and including an anode, a mercury pool cathode and an associated control member of the immersion-ignitor or make-alive type such as that disclosed and claimed in United States Letters Patent No. 2,069,283 granted February 2, 1937, upon an application of Joseph Slepian et al. Control or excitation circuits are associated with the immersion-ignitor control members to initiate arc discharges within the electric valves initially to short circuit the electrical apparatus or at least establish a low impedance by-pass around said apparatus when the voltage impressed thereacross tends to exceed a predetermined value.

For a better understanding of my invention, reference may be had to the following description taken in connection with the accompanying drawing and its scope will be pointed out in the appended claims. Figs. 1 and 2 of the accompanying drawing diagrammatically illustrate my invention as applied to a protective system for a series capacitance in which the capacitance is shunted by a discharge device comprising a pair of principal arcing members and a control electrode associated with one of the principal members to initiate an arc discharge therebetween. Figs. 3, 4 and 5 diagrammatically illustrate other embodiments of my invention as applied to a protective system for a series capacitance in which electric valves are connected across the terminals of the capacitance to short circuit the capacitance when the voltage impressed thereacross tends to exceed a predetermined value.

Referring now to Fig. 1 of the accompanying drawing, there is diagrammatically illustrated an embodiment of my invention as applied to a protective system for electrical apparatus which is subjected to variable voltage operating conditions. For the purpose of illustrating my invention, I have chosen to show it as applied to an arrangement for protecting a series capacitance 1 which may be connected in an electric power transmission or distribution circuit 2. In order to limit the voltage impressed across the terminals of the series capacitance 1, I provide an electric discharge device 3 which may comprise a pair of principal electrodes 4 and 5 between which the main electric discharge passes. The principal electrodes 4 and 5 may be provided with arcing horns 6 and 7 to obtain effective interruption of the arc and to provide an arrangement for dissipating the heat generated by the arc. The principal electrodes 4 and 5 are connected in circuit across the terminals of the series capacitance 1. As an agency for effecting initiation of an arc discharge between principal electrodes 4 and 5 when the voltage of circuit 2 or the voltage of capacitance 1 exceeds a predetermined value, I provide a control member or electrode 8 which is associated with one of the principal electrodes such as electrode 4. The control electrode 8 may be arranged to have an initiating point or tip 9, the position of which relative to electrode 4 is accurately determinable in order to effect precise control of the voltage at which the main arc discharge is initiated. A current limiting impedance, such as a resistance 10, may be connected in series relation with the principal electrodes 4 and 5. In order to impress on control electrode 8 a potential which varies as the voltage of circuit 2 or the voltage of capacitance 1, I provide a voltage responsive circuit which may include an auto-transformer 11 having a terminal 12 which is connected to the right-hand terminal of capacitance 1, and having a terminal 13 which is connected in circuit with the left-hand terminal of capacitance 1.

I provide an additional protective circuit including a conductor 14 which is arranged to be connected in parallel with the capacitance 1 and the discharge device 3. The additional protective circuit may include a device, such as a contactor or relay 15, which closes the circuit in accordance with an arc discharge between the principal electrodes 4 and 5 or in accordance with an arc discharge between electrode 4 and the control electrode 8. The relay 15 may comprise an actuating coil 16, a holding coil 17, an armature 18 and cooperating contacts 19.

The operation of the embodiment of my invention diagrammatically illustrated in Fig. 1 will be explained by first considering the system during normal operation, that is, when the voltage of capacitance 1 or the voltage of circuit 2 does not exceed the predetermined value established by the position of point 9 of the control electrode 8. Under this condition of operation, the circuit permits the transfer of energy through the capacitance 1, the voltage appearing thereacross not being sufficient to initiate an arc discharge between the principal electrode 4 and control electrode 8. If it be assumed that the voltage across capacitance 1 rises to that value established by the adjustment of point 9 of control electrode 8, an arc discharge will be initiated between the principal electrode 4 and the control electrode 8. This auxiliary arc discharge will almost instantaneously initiate a main discharge between principal electrodes 4 and 5. In response to the flow of current due to the auxiliary discharge, or in response to the flow of current due to the main discharge, armature member 18 of relay 15 will be moved by actuating coil 16 so that contacts 19 are brought into engagement to short circuit effectively the capacitance 1, thereby limiting the voltage which is impressed thereacross. So long as voltage exists across the terminals of capacitance 1, holding coil 17 of relay 15 will maintain the protective circuit closed. As soon as the voltage of circuit 2 decreases to a safe value, relay 15 is sufficiently de-energized to permit disengagement of contacts 19, thereby restoring the system to the operating condition to permit transfer of energy through capacitance 1.

An important feature of my invention is the rapidity with which the voltage impressed across capacitance 1 is reduced due to the speed with which an arc discharge is initiated between principal electrodes 4 and 5. In addition, the duty imposed on the arc discharge device 3 is light since contactor 15 is actuated as soon as the arc discharge is initiated. In this manner the arc discharge device 3 is relieved of excessive duty and the surfaces of the principal electrodes 4 and 5 and the control electrode 8 are not materially affected by the arc discharges, thereby permitting the device 3 to be employed for a large number of such operations without requiring frequent inspection or replacement of parts.

In Fig. 2 there is shown another embodiment of my invention which is similar in many respects to that shown in Fig. 1 and corresponding elements have been assigned like reference numerals. The arc discharge device 3 is connected across the terminals of capacitance 1 to limit the voltage thereof; and the relay 15 is similarly employed to connect in parallel the additional protective circuit, including conductor 14, upon initiation of an arc discharge through device 3. In the arrangement of Fig. 2 the control electrode 8 is shown as being placed within the region between main electrodes 4 and 5 so that a sufficient potential impressed on electrode 8 will initiate an arc discharge between either of the main electrodes and the control electrode. In order to effect precise energization of the control electrode 8 and to effect initiation of an arc discharge between main electrodes 4 and 5 in accordance with the voltage of capacitance 1, I provide a voltage sensitive device having a critical operating voltage such as an electric valve 20 which may be of the glow discharge type having a pair of cold electrodes 20a and 20b. If desired, I may connect a similar electric valve 21 in parallel with the electric valve 20 in those applications where it is desirable to provide assurance against failure of one of the valves. A transformer 22, having a primary winding 23 and a secondary winding 24, may be connected across capacitance 1 to provide a voltage which varies as the voltage of capacitance 1; and a transformer 25, having a primary winding 26 and a secondary winding 27, may be provided to interconnect transformer 22 and electric valves 20 and 21 with control electrode 8. Primary winding 26 of transformer 25 is connected in series relation with secondary winding 24 of transformer 22 and electric valves 20 and 21, and secondary winding 27 is provided with one terminal which is connected to the principal electrode 4 and another terminal which is connected to the control electrode 8. For this arrangement of connections, it is to be understood that the initiating arc discharge will be established between main electrode 4 and the control electrode 8.

The operation of the embodiment of my invention shown in Fig. 2 is substantially the same as that explained above in connection with Fig. 1. During normal operation the system permits the transfer of energy through the capacitance 1. If it be assumed that the voltage impressed across capacitance 1 increases to a value sufficient to initiate an arc discharge in electric valve 20 or 21, there is impressed across the terminals of primary winding 26 of transformer 25 an impulse of voltage which induces in secondary winding 27 a voltage sufficient to establish an initiating arc discharge between main electrode 4 and control electrode 8. Almost instantaneously, a main arc discharge is established between electrodes 4 and 5, establishing an electric circuit in parallel with capacitance 1. The flow of curernt through coil 16 of relay 15 actuates the relay and closes contacts 19, thereby short circuiting both capacitance 1 and discharge device 3. As a result thereof, the arc between electrodes 4 and 5 will be extinguished and the relay 15 will be maintained in the closed position by the holding coil 17. This condition will continue until the voltage of circuit 2 decreases to a safe value. The relay 15 will thereupon automatically open to permit the normal operation of the system.

In Fig. 3 of the accompanying drawing there is diagrammatically illustrated another embodiment of my invention for protecting electrical apparatus, such as a series capacitance. A pair of oppositely disposed electric valves 28 and 29 are connected across the capacitance 1 to limit the voltage thereof. The electric valves 28 and 29 are preferably of the type employing an ionizable medium, such as a gas or a vapor, and may be of the type employing control members of the make-alive or immersion-ignitor type such as that disclosed in the above-mentioned Slepian et al. patent. Each of the electric valves 28 and 29 includes an anode 30, a mercury pool cathode 31 and a control member 32 of the immersion-ignitor type. A current limiting resistance 33 may be connected in series relation with the electric valves 28 and 29.

To effect energization of the control members 32 of electric valves 28 and 29 when the voltage of circuit 2 or the voltage of capacitance 1 attains a predetermined value, I provide excitation circuits 34 and 35 which are associated with electric valves 28 and 29, respectively. Excitation circuits 34 and 35 are similar in construction and arrangement and each includes electric valves 36 and 37 which are preferably of the glow discharge type comprising a pair of cold electrodes. By virtue of the characteristics of these electric valves, the associated control member 32 is energized at an accurately determinable value of voltage of circuit 2; that is, these electric valves are designed to conduct current at a definite value of applied voltage. The electric valves 36 and 37 may be connected in series relation with each other if desired and are connected between the circuit 2 and the control member 32. Of course, the electric valves 36 and 37 are also connected in series relation across the anode circuit for electric valve 28 and the control member 32. As an agency for obtaining the desired voltage distribution across the electric valves 36 and 37, I provide a voltage divider including resistances 38 and 39, having an electrical intermediate connection or juncture 40, which is connected to a common juncture 41 of electric valves 36 and 37. By virtue of this arrangement, the electric valves 36 and 37 are rendered conductive at the same time to effect the desired energization of control member 32 when the anode-cathode voltage of electric valve 28 attains a certain value.

It will be understood that when the glow discharge valves 36 and 37 break down, there will be applied to the control members 32 peaked voltages having perpendicular wave fronts. Considering in particular one-half cycle of voltage of circuit 2 in which the voltage rises above the critical value for the system, the valves 36 and 37 associated with one of the main valves 28 or 29 will not break down until the voltage thereacross reaches the resultant ionizing potential, at which time an impulse of voltage of perpendicular wave front will be applied to the associated control member. After the main valve becomes conductive, it will be understood that the voltage across the anode 30 and cathode 31 will decay to a relatively small value corresponding, or approximately equal to, the arc voltage drop between the anode and the cathode. The voltage drop appearing across the resistances 33 is not sufficient to maintain valves 36 and 37 in a conductive condition after an arc discharge is established between the anodes and the cathodes of the main valves 28 and 29.

During normal operation of the arrangement shown in Fig. 3 the voltage appearing across the terminals of capacitance 1 is not sufficient to render electric valves 36 and 37 conductive, and hence electric valves 28 and 29 are maintained in a nonconducting condition. If the voltage of circuit 2 or the voltage of capacitance 1 exceeds a predetermined safe operating value, the voltage appearing across the terminals of electric valves 36 and 37 is increased to that value which will render these electric valves conductive and effect energization of the associated immersion-ignitor control members 32. The control members 32 are energized from the anode-cathode circuits of electric valve 28 or 29. So long as the voltage of circuit 2 remains above the critical value, electric valves 28 and 29 will be rendered conductive to effectively short circuit capacitance 1, thereby limiting the voltage impressed thereacross. As soon as the voltage of circuit 2 decreases to a value insufficient to render electric valves 36 and 37 conductive, electric valves 28 and 29 are maintained nonconductive and the system resumes normal operation, permitting the transfer of energy through capacitance 1.

Fig. 4 represents another embodiment of my invention which is similar in many respects to the arrangement shown in Fig. 3, and corresponding elements have been assigned like reference numerals. To render electric valves 28 and 29 conductive when the voltage of capacitance 1 exceeds the predetermined value, I provide a transformer 42 which is connected across capacitance 1 to produce control voltages which vary in response to the capacitance voltage. The transformer 42 includes secondary windings 43 and 44. Voltage responsive elements, such as electric valves 45 and 46 of the glow discharge type, are connected in series relation with secondary windings 43 and 44 to effect energization of control members 32 of electric valves 28 and 29, respectively, when the voltage of capacitance 1 exceeds a predetermined value.

The arrangement shown in Fig. 4 functions to limit the voltage of capacitance 1 when the voltage exceeds a certain value. Under normal operating conditions, the voltage induced in secondary windings 43 and 44 is not sufficient to render electric valves 45 and 46 conductive, and electric valves 28 and 29 are maintained in a nonconducting condition. However, when the voltage of capacitance 1 exceeds the predetermined value, electric valves 45 and 46 are rendered conductive effecting the transmission of curent to control members 32 of electric valves 28 and 29 so that these electric valves effectively short circuit capacitance 1, limiting the voltage thereof. So long as the voltage of circuit 1 remains above the critical value, electric valves 28 and 29 short circuit capacitance 1. When the voltage of circuit 2 decreases to a value insufficient to render electric valves 45 and 46 conductive, electric valves 28 and 29 remain nonconductive and the system resumes normal operation.

In Fig. 5 of the accompanying drawing, there is diagrammatically illustrated a further embodiment of my invention in which the electric valves 28 and 29, previously described in connection with Figs. 3 and 4, are oppositely disposed across the terminals of capacitance 1 and which effectively short circuit the capacitance when in a conductive condition.

As an agency for effecting energization of control members of electric valves 28 and 29 when the voltage of circuit 2 or the voltage of capacitance 1 exceeds a predetermined value, I provide excitation circuits 47 and 48 which are associated with electric valves 28 and 29, respectively. Excitation circuits 47 and 48 are similar in construction and arangement and in order to facilitate the descripion thereof circuit 47 will be considered in particular. An electronic discharge device 49 is connected to control member 32 of electric valve 28 to transmit current thereto when it is desired to render electric valve 28 conductive. Electronic device 49 is preferably of the type employing an ionizable medium and includes an anode 50, a cathode 51, a control electrode 52 and a pair of auxiliary electrodes 53 which may be connected to the cathode 51. If desired, the anode 50 of the discharge device 49 may be connected to anode 30 of electric valve 28, as shown in Fig. 5, or it may be connected to be energized from a separate source of alternating current. A current limiting resistance 54 may be connected in series relation with the discharge device 49, and a protective device, such as a fuse 55, may also be connected in series relation with device 49.

To impress on control member 52 of discharge device 49 a voltage to render the discharge device conductive when the voltage of capacitance 1 or the voltage of circuit 2 exceeds a predetermined value, I employ a circuit including a suitable impedance element such as a resistance 56 which is connected in circuit with control member 52. A transformer 57 having a primary winding 58 and secondary windings 59 and 60 is provided to produce control voltages which vary as the voltage of capacitance 1. Secondary winding 59 is associated with excitation circuit 47 and secondary winding 60 is associated with excitation circuit 48. I provide a voltage sensitive element, such as an electric valve 61 of the glow discharge type, which is connected in series relation with the resistance 56 to transmit current therethrough when the voltage of circuit 2 exceeds the predetermined value. The circuit is arranged so that under such conditions the voltage appearing across the terminals of resistance 56 is sufficient to render discharge device 49 conductive.

As an agency for maintaining discharge device 49 nonconductive, except when the voltage of circuit 2 exceeds the predetermined value, I employ an arrangement including a source of alternating current 62 and a transformer 63 having a secondary winding 64 and a self-biasing circuit including a parallel connected capacitance 65 and a resistance 66. The capacitance 65 and resistane 66 are connected in series relation with resistance 56 and control member 52, and comprise a negative unidirectional biasing potential on control member 52 which tends to maintain the discharge device 49 nonconductive except during those intervals when electric valve 61 is conductive. It is to be understood that the phase of the voltage of circuit 62 may be controlled or adjusted to effect the proper operation of the electric valves 49. Any suitable phase shifting device, such as a rotary phase shifter (not shown), may be employed for this purpose.

Under normal operating conditions, electric valves 28 and 29 are maintained in a nonconductive condition. Electronic discharge devices 49 are also maintained in a nonconductive condition by virtue of the negative unidirectional biasing potentials impressed on control members 52 by means of the self-biasing circuits including capacitances 65 and resistances 66. When the voltage of circuit 2 or the voltage impressed across capacitance 1 tends to exceed the predetermined value, electric valves 61 are rendered conductive to transmit current through resistance 56. The voltages appearing across the terminals of resistances 56 are sufficient to overcome the negative biasing potentials and render discharge devices 49 conductive. Discharge devices 49, which are energized from the anodecathode circuits of electric valves 28 and 29, transmit currents to control members 32 to render the electric valves 28 and 29 conductive, thereby effectively short circuiting capacitance 1 and maintaining the voltage thereof at a safe value. So long as the voltage of capacitance 2 tends to rise above the safe value, electric valves 28 and 29 will be rendered conductive in this manner. As soon as the voltage decreases below the critical value, the voltage induced in secondary windings 59 and 60 of transformer 57 will be insufficient to establish discharges within electric valves 61, so that discharge devices 49 and electric valves 28 and 29 are maintained in a nonconductive conditon. In this manner, the circuit automatically responds to limit the voltage impressed across the terminals of capacitance 1.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric circuit, an electric valve connected to said circuit and comprising an anode, a cathode and a control member of the immersion-ignitor type, and an excitation circuit comprising an electric valve of the glow discharge type connected in series relation with said control member and connected to be responsive to the voltage of said anode to effect energization of said control member when the anode-cathode voltage of said first-mentioned valve attains a predetermined value.

2. In combination, an electric circuit, electrical apparatus connected therein, a pair of oppositely disposed electric valves connected across said apparatus, each of the electric valves comprising an anode, a cathode and a control member of the immersion-ignitor type, a pair of excitation circuits each associated with a different one of the control members and each comprising an electric valve of the glow discharge type resopnsive to the anode voltage of the associated first mentioned electric valve for effecting application of a peaked voltage to the associated control member when the voltage impressed across said apparatus attains a predetermined value.

3. In combination, an electric circuit, an electric valve connected in said circuit and comprising an anode, a cathode and a control member of the immersion-ignitor type for initiating an arc discharge between said anode and said cathode, and an excitation circuit responsive to the polarity of said anode for energizing said immersion-ignitor control member and comprising a voltage divider and a pair of serially connected electric valves of the glow discharge type connected in parallel with said voltage divider to transmit to the associated control member an impulse of current when the voltage of said circuit exceeds a predetermined value.

4. In combination, an electric circuit, an electric valve connected in said circuit and comprising an anode, a cathode and a control member of the immersion-ignitor type for initiating an arc discharge between said anode and said cathode, and means for transmitting to said control member an impulse of current of peaked wave form when the voltage impressed across said anode and said cathode attains a predetermined value comprising a pair of serially connected electric valves and a voltage divider connected in parallel with said pair of valves to maintain a predetermined voltage distribution thereacross.

5. In combination, an electric circuit, an electric valve connected in said circuit and comprising an anode, a cathode and a control member of the immersion-ignitor type for initiating an arc discharge between said anode and said cathode, a voltage divider connected between said circuit and said control member and having an electrical intermediate connection, and a pair of serially connected electric valves of the glow discharge type connected between said circuit and said control member for transmitting thereto impulses of current of peaked wave form when the voltage of said circuit exceeds a predetermined value, a common juncture of said pair of electric waves being connected to said electrical intermediate connection.

6. In combination, an electric circuit, electrical apparatus connected therein, an electric valve connected in parallel with said apparatus and comprising an anode, a cathode and a control member, an electronic discharge device for effecting energization of said control member and comprising a grid for controlling the conductivity thereof, means for impressing on said grid a biasing potential tending to maintain said electronic discharge device nonconductive, and means having a critical minimum potential operating characteristic and being responsive to the voltage of said apparatus for impressing on said grid a voltage sufficient to overcome said biasing potential to render said discharge device conductive when the voltage of said apparatus exceeds a predetermined value.

7. In combination, an electric circuit, electrical apparatus connected in said circuit, an electric valve connected in parallel with said apparatus and including an anode, a cathode and a control member for establishing an arc between said anode and said cathode, an electronic discharge device for effecting energization of said control member and comprising a grid for controlling the conductivity thereof, an impedance element connected in circuit with said grid, and means responsive to the voltage of said apparatus for rendering said discharge device conductive comprising an electric valve of the glow discharge type for transmitting current through said element when the voltage of said apparatus exceeds a predetermined value.

8. In combination, an electric circuit, electrical apparatus connected in said circuit, an electric valve connected in parallel with said apparatus and including an anode, a cathode and a control member for establishing an arc discharge between said anode and said cathode, an electronic discharge device for effecting energization of said control member and comprising a grid for controlling the conductivity of the electric valve, and means comprising a control electric valve of the glow discharge type for impressing on said grid a voltage to render said discharge device conductive when the voltage of said circuit exceeds a predetermined value.

9. In combination, an electric circuit, electrical apparatus connected in said circuit, an electric valve connected in parallel with said apparatus and comprising an anode, a cathode and a control member for establishing an arc discharge between said anode and said cathode, an electronic discharge device for effecting energization of said control member and comprising a grid for controlling the conductivity thereof, means for impressing on said grid a negative biasing potential comprising a source of alternating current and a parallel connected capacitance and a resistance connected in series with said source, a resistance connected in series relation with said capacitance and said first mentioned resistance, and an electric valve of the glow discharge type responsive to the voltage of said apparatus to transmit current through said second mentioned resistance to render said discharge device conductive.

10. In combination, an electric circuit, an electric valve connected thereto and comprising an anode, a cathode and a control member of the immersion-ignitor type for initiating an arc discharge between said anode and said cathode, an electronic discharge device connected between said anode and said control member and including a grid for controlling the conductivity thereof, an impedance element connected in circuit with said grid, a source of alternating current, and an electric valve of the glow discharge type connected between said source and said element for transmitting current through said element to render said discharge device conductive.

11. In combination, an electric circuit, electrical apparatus connected in said circuit, an electric valve connected thereto and comprising an anode, a cathode and a control member of the immersion-ignitor type for initiating an arc discharge between said anode and said cathode, and a circuit for effecting application of a voltage of peaked wave form to said control member when the voltage of said apparatus exceeds a predetermined value and comprising an electric valve of the glow discharge type having a critical minimum ionizing potential characteristic.

ROY C. BUELL.